(12) United States Patent
Barber

(10) Patent No.: US 6,360,826 B1
(45) Date of Patent: Mar. 26, 2002

(54) WEED HOOK

(76) Inventor: Marvin M. Barber, 31549 Monte Vista Crescent, Abbotsford, British Columbia (CA), V2T 1Y8

( * ) Notice: Subject to any disclaimer, the term of this patent is extended or adjusted under 35 U.S.C. 154(b) by 0 days.

(21) Appl. No.: 09/705,799

(22) Filed: Nov. 6, 2000

(51) Int. Cl.[7] ................................................ A01B 1/08
(52) U.S. Cl. ...................................................... 172/371
(58) Field of Search ................................ 172/371, 372, 172/373, 375, 378, 379, 380, 381, 795, 797; 403/379, 378, 380; 7/114; 30/276, 123

(56) References Cited

U.S. PATENT DOCUMENTS

| | | | | |
|---|---|---|---|---|
| 1,390,797 A | * | 9/1921 | Lea | 172/371 |
| 1,549,042 A | * | 8/1925 | Masters | 172/371 |
| 2,019,357 A | * | 10/1935 | Oestreich | 172/371 |
| 2,680,255 A | * | 6/1954 | Potter | 172/371 |
| 3,293,674 A | | 12/1966 | Sapia | 7/14.1 |
| 3,847,226 A | | 11/1974 | Long | 172/371 |
| 4,177,864 A | * | 12/1979 | Donnini | 172/371 |
| 4,890,679 A | * | 1/1990 | Jacobs | 172/371 |
| 5,477,929 A | * | 12/1995 | Kenyon et al. | 172/372 |

* cited by examiner

Primary Examiner—Robert E. Pezzuto

(57) ABSTRACT

A weeding implement has an elongate handle and an attachment at one end of the handle, the attachment comprising a straight shank inserted into one end of the handle, a straight portion extending at an angle from the straight shank, a straight transverse portion extending across the longitudinal axis of the shank, a curved intermediate portion connecting the straight portion to one end of the transverse portion at one side of the axis and a flat end portion offset from the axis at an opposite side of the axis. The flat end portion extends in a plane perpendicular to the axis, and the attachment is in one piece of a length of metal rod, which is flattened at one end to form the flat end portion.

1 Claim, 4 Drawing Sheets

WEED HOOK

BACKGROUND OF THE INVENTION

1. Field of the Invention

The present invention relates to a weeding implement and, more particularly, to a weeding implement of the type comprising an elongate handle provided at one end with an attachment for working soil.

2. Description of the Related Art

In agricultural and horticultural production, crops are normally planted in rows with adequate space between the rows to allow for plant growth and for access to the plants. These spaces between the plants must be kept free of weeds, and this is traditionally effected by means of hoes or other mechanical devices.

It is, however, a disadvantage of these devices that, because of the aggressive manner in which they work the soil, they must be kept at a safe and adequate distance from the cultivated plants in order to avoid damage to the plants or, even, complete destruction of the plants.

Consequently, weeds left in the immediate vicinity of the plants must be dealt with in some other fashion, usually by pulling them by hand.

BRIEF SUMMARY OF THE INVENTION

It is accordingly an object of the present invention to provide a novel and improved weeding implement which enables even weeds growing in the relatively close vicinity to cultivated plants to be removed.

According to the present invention, there is provided a weeding implement which comprises an elongate handle and an attachment at one end of the handle. The attachment comprises a straight shank inserted into one end of the handle, a straight portion extending at an angle from the shank, a straight transverse portion extending across the longitudinal axis of the shank, a curved intermediate portion connecting the straight portion to one end of the transverse portion at one side of said axis and a flat end portion offset from said axis at an opposite side of said axis, said flat end portion extending in a plane transverse to said axis.

Preferably the attachment is in one piece and formed by a length of metal rod and is in one piece.

BRIEF DESCRIPTION OF THE DRAWINGS

The invention will be more readily understood from the following description of a preferred embodiment thereof given, by way of example, with reference to the accompanying drawings, in which.

DESCRIPTION OF THE PREFERRED EMBODIMENT

Figure 4:
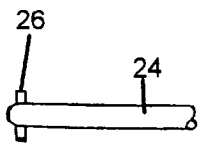
FIGS. 4 and 5 show broken-away views taken in elevation from opposite sides of parts of an attachment forming one end of the weeding implement of FIG. 1.
Figure 5:
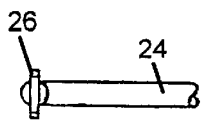
Figure 1:
FIG. 1 shows a view in perspective of a weeding implement embodying the present invention.
Figure 3:
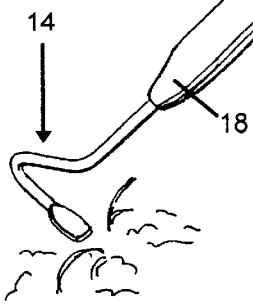
FIG. 3 shows a view in end elevation of the weeding implement of FIG. 1.
Figure 3:
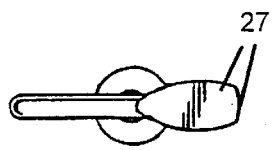
Figure 2:
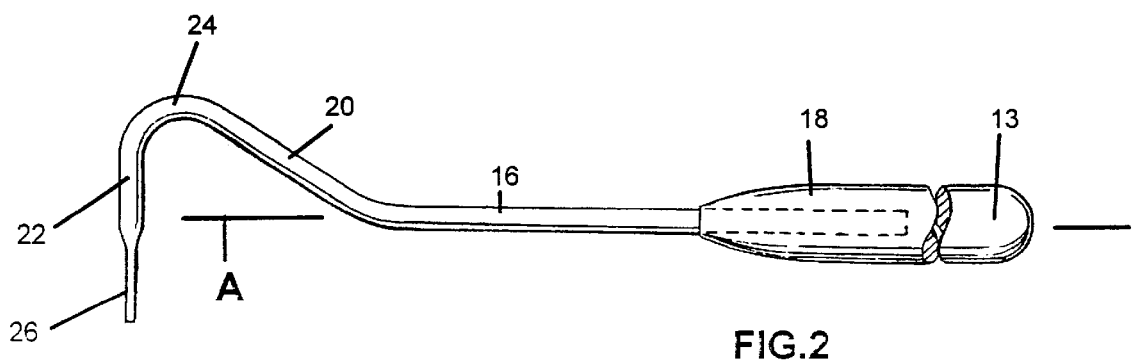
FIG. 2 shows a broken-away plan view of the weeding implement of FIG. 1.

Referring firstly to FIGS. 1 to 5 of the accompanying drawings, in which reference numeral 10 indicates generally a weeding implement embodying the present invention, the weeding implement comprises an elongate wooden handle 12, which is provided at one end with a through hole 13, and a hook-shaped attachment indicated generally by reference numeral 14.

The hook-shaped attachment 14 is formed in one piece of metal rod and comprises a straight shank 16, which is inserted into one end 18 of the handle, a straight portion 20 extending at an angle from the shank 16, a straight bar or transverse portion 22, which extends across the longitudinal axis A of the shank 16 and the handle 12, a curved intermediate portion 24 connecting the straight portion 20 to one end of the transverse portion 22, at one side of the axis A, and a plough or flat end portion 26. The flat end portion 26 extends ill a plane perpendicular to the axis A and has rounded side and end edges 27. The shank 16 has a lengthy extending along the axis A from the handle 12, which is a major portion of that of the attachment 14.

The advantages of the weeding implement 10 will be more readily apparent from the following discussion of the manner of use of the implement 10 when taken in conjunction with FIGS. 6 to 12 of the accompanying drawings.

Figure 6:
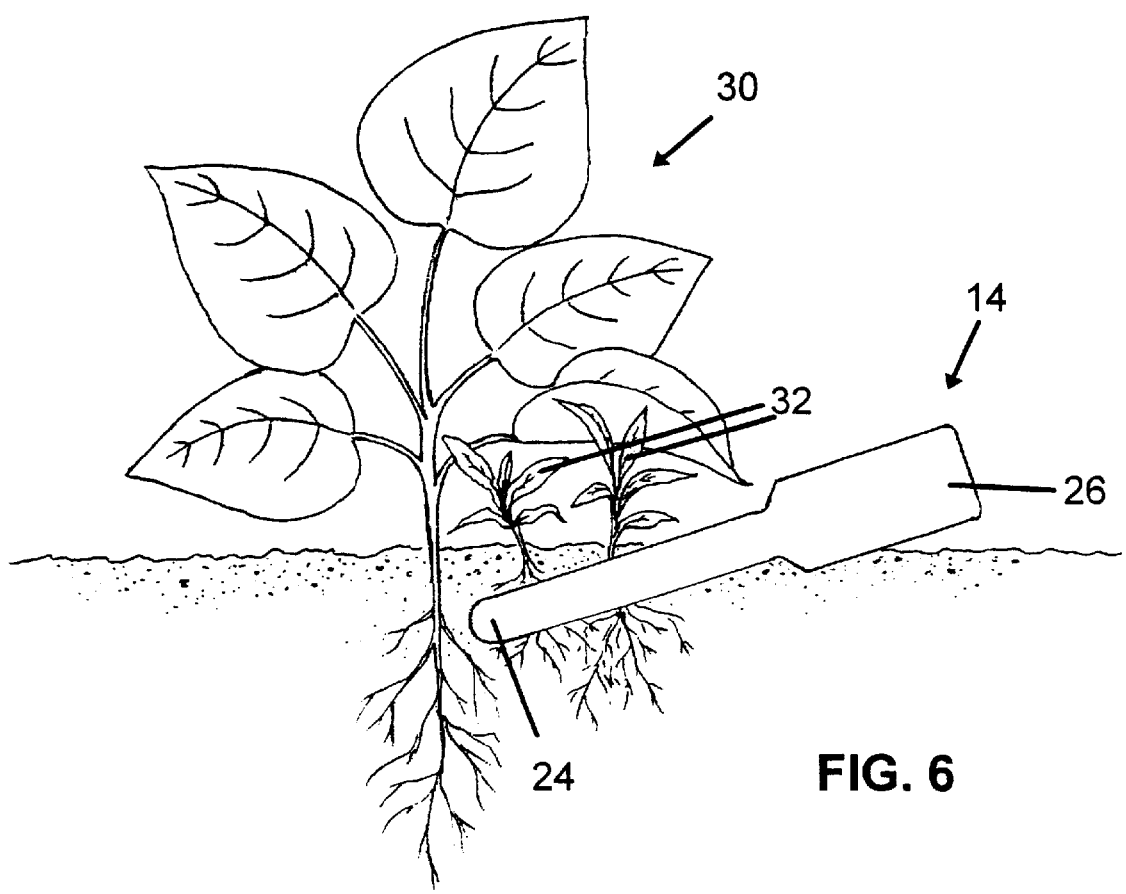
FIG. 6 shows a view in end elevation of the weeding implement of FIG. 1 in use in the ground.
Figure 7:
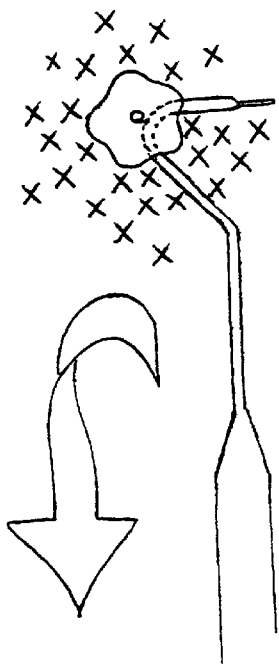
FIGS. 7 to 10 show broken-away plan views of the weeding implement of FIG. 1 in use in removing weeds from around a plant.
Figure 8:
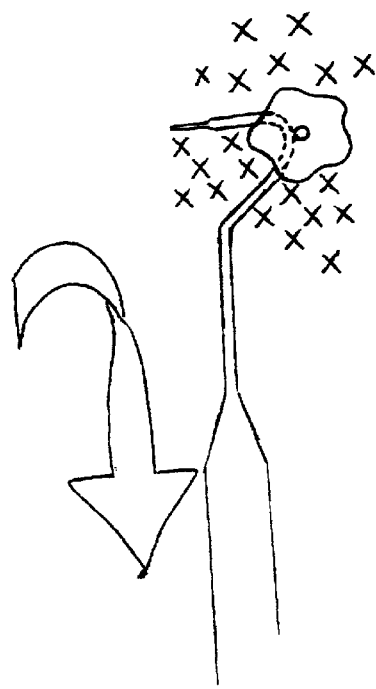
Figure 9:
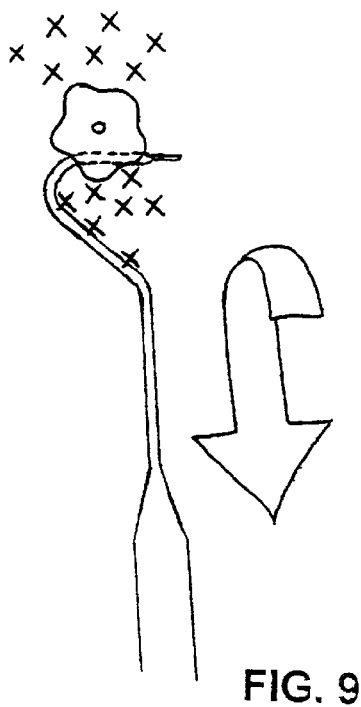
Figure 10:
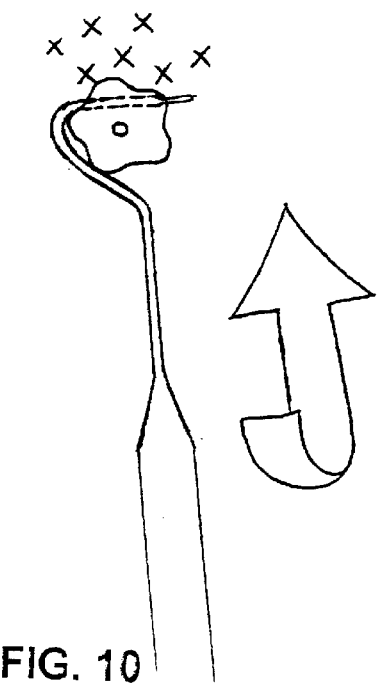

Referring now to FIG. 6, the hook-shaped attachment 14 can be seen in this figure in use between a cultivated plant, indicated generally by reference numeral 30, and a pair of weeds 32. The hook-shaped attachment 24 has been inserted into the ground so that the intermediate portion 24 is located between the cultivated plant 30 on one hand, and the weeds 32, on the other hand. The intermediate portion 24 is placed next to the plant 30 on one side or the other of the plant 30 and with the flattened end portion 26 pointed away from the plant 30 and kept above the surface of the soil as the curved intermediate portion 24 is forced downwardly into the soil and then drawn laterally through the soil to remove the weeds 32. The same procedure is then repeated on the opposite side of the plant 30. The curved intermediate portion 24 will readily penetrate garden soil when pressure is applied to it with a slight rotation of the handle 12. Therefore, by moving the hook-shaped attachment 14 to the right, as viewed in FIG. 6, the weeds 32, which have a tendency to wrap around the rod forming the intermediate portion 24, can be removed without damage to the cultivated plant 30. Since there are no sharp edges on the attachment 14, the weeds are pulled out in their entireties while the plant 30 remains undisturbed.

The hook-shaped attachment 14, which has only a very narrow shape in profile, is able to pass through the soil without substantial disturbance of the soil. Only the intermediate portion 24 is used in the critical root area of the plant being weeded.

In an alternative manner of using the weeding implement 10, the hook-shaped attachment, instead of being moved sideways as described above, is pushed and pulled to and fro in a direction generally transverse to the transverse portion 22 and generally parallel to the surface of the ground so as to cause weeds to become pulled from the ground, pinned between the transverse portion 22 and the ground and then dragged so as to be wrapped around the transverse portion 22. The weeding implement can then be raised to lift the thus-caught weeds from the ground so that they can be deposited, as described, e.g. in a pile on the ground or a collecting container such as a bucket.

Thus, in a very simple manner, the weeds can be removed from the vicinity of cultivated plants, and then deposited in a desired location without any need to stop and grasp the weeds, thus eliminating hand weeding. The user of the weeding implement is thereby enabled to remain in a substantially upright position during the entire weeding operation.

If necessary, the plough or flat end portion 26 can be pointed downwardly to assist in penetration of the soil, but it is the curved or bent intermediate portion 24 and/or the transverse portion 22 which are used to remove the weeds by the above-described lateral and/or forward and backward motions of the weeding implement 10.

By removing the weeds 32 by their roots, rather than pulling them from their tops, the weeds can be permanently destroyed. Consequently, even those weeds of the type which will grow from their roots even after their tops have been removed can be successfully and permanently eradicated by the present weeding implement.

It will be apparent that the present weeding implement is not a hoe or a "chopping" or "prying" tool intended to cut the weeds and has no sharp cutting edges but, by use in a laterally moved manner, can provide effective weeding without substantial soil disturbance.

The use of the present weeding implement is still further illustrated in FIGS. 7 to 10, in which it is shown removing weeds to the right, to the left, to the front and the rear, respectively, of the cultivated plant 30.

For removing weeds in front of the plant, the transverse portion 22 is placed next to the plant and is drawn through the soil by a downward pressure and a pull and, for weeds behind the plant, by a downward pressure and a push.

In this way, all four sides of the plant can be cleared of weeds without bending or stooping. If required, soil can be moved closer to the plant by means of the flattened end portion 26, the main purpose of which is to mulch the soil in order to inhibit weed germination and to facilitate subsequent weeding. By tilting the flattened end portion to 5 to 10 degrees below the horizontal and using a to and fro motion with a little downward pressure, a soil mulch to a desirable depth of, for example, one inch is easily achieved. Any footprints causing compacted soil can be removed in this manner.

The flattened end portion 26 is also a very effective landscaping tool where bark mulch is employed. The mulch and any branch prunings can be raked up, and the weeds obliterated, without pulling the bark mulch out of place.

If required, the flattened end portion 26 can be pointed downwardly and employed for deep penetration of the soil to rake quack grass roots to the surface. Since the flattened end portion 26 has no cutting edges, all of the roots can be extracted, without leaving remnants which might regrow.

In rock gardens, the flattened end portion can be used by pointing it downwardly or under a rock, since no roots are involved. Weeds can thereby removed, leaving the soil in a desirable condition. This can be achieved without sitting or squatting.

Figure 11:
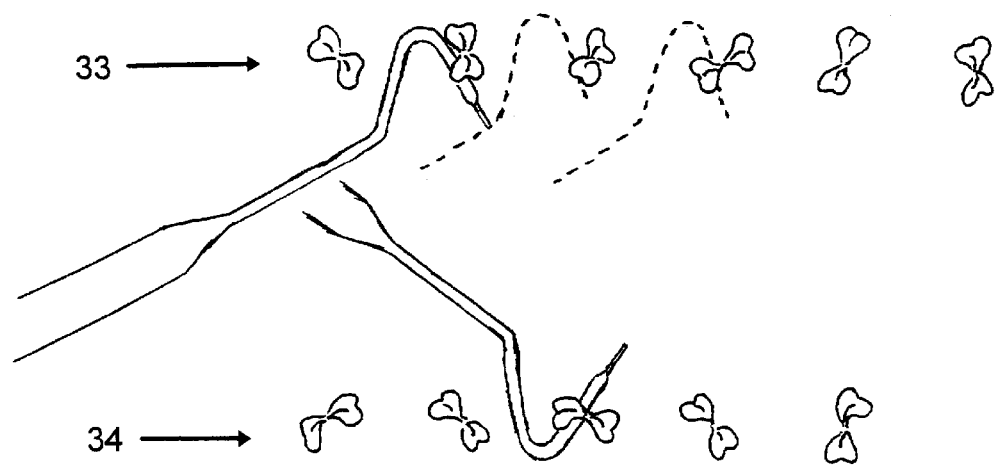
FIG. 11 shows the weeding implement of FIG. 1 in use on two rows of cultivated plants.

Since the flat end portion 26 is offset from one side of the axis A of the shank, the weeding implement 10 can be readily rotated about this axis to move the flat end portion 26 from one side to the other of the axis. This action is illustrated in FIG. 11, in which the weeding implement is shown weeding firstly an upper row, indicated generally by reference numeral 32, and subsequently a lower row, indicated generally by reference numeral 34.

The elongate shank 16 is of sufficient length to allow the area being worked to be visible by the person using the weeding implement 10. The shank 16 has the advantage that it enables the attachment 14 to be slid under spreading plants without catching on the plants and thereby damaging the plants. Weeds can therefore be removed without stooping to insert the implement under plants and without inserting the implement downwardly through the plant, while the user remains standing in an upright position.

Figure 12:
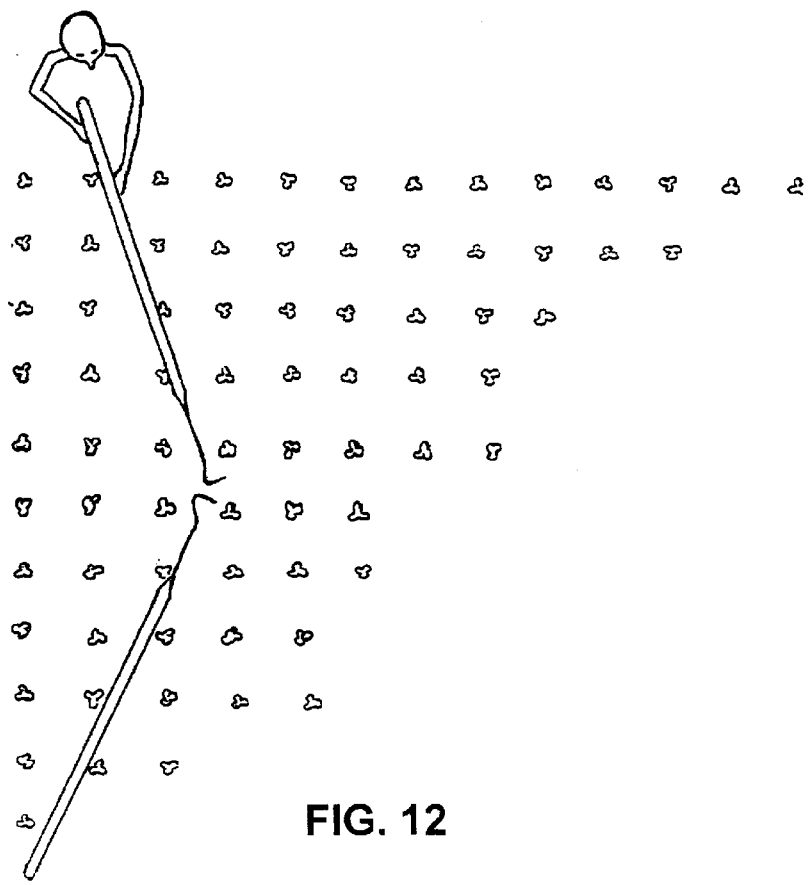
FIG. 12 shows a plan view of the weeding implement of FIG. 1 in use on multiple rows of plants.

FIG. 12 shows how the weeding implement 10 can be readily employed to reach over a number of rows of plants. This is facilitated by the light-weight handle 12, and enables the number of walkways which are requires to be reduced, thus increasing the area available for productive plant growth. The handle 16 also facilitates weeding of terraces and embankments.

It should be noted, in particular, that the hook attachment 14 has no cutting edges, which would cause weeds to be cut rather than extracted and which might therefore result in regrowth of the weeds.

The present weeding implement is particularly advantageous in rock gardens, where the flat end portion 26 can be pointed downwardly or inserted under rocks to remove weeds and, nevertheless, to leave the soil in a relatively undisturbed condition. The flat end portion 26 is also useful for mulching, but the present invention is not intended to be employed as a topping tool.

As will be apparent to those skilled in the art, modifications of the above-described embodiment of the present invention may be made within the scope and spirit of the accompanying claims.

I claim:

1. A weeding implement, comprising:

an elongate handle having a longitudinal axis, and an attachment at one end of said handle, said attachment comprising a straight shank inserted into one end of said handle, and extending along said longitudinal axis;

said shank having a length thereof, extending along said axis from said handle, which is a major portion of that of said attachment, a straight portion extending at an angle from said straight shank, a straight transverse portion extending across said longitudinal axis and laterally at opposite sides of said axis, a curved intermediate portion connecting said straight portion to one end of said transverse portion at one side of said axis and a flat end portion offset from said axis at an opposite side of said axis, said flat end portion extending in a plane perpendicular to said axis and having rounded side and end edges, said attachment comprising a length of metal rod, and said metal rod being flattened at one end to form said flat end portion.

* * * * *